United States Patent
Fudally (10) Patent No.: US 7,606,291 B2
(45) Date of Patent: Oct. 20, 2009

(54) METHOD AND SYSTEM FOR TRANSMIT FREQUENCY HOPPING

(75) Inventor: Scott A. Fudally, Coral Springs, FL (US)

(73) Assignee: Motorola, Inc., Schaumburg, IL (US)

(*) Notice: Subject to any disclaimer, the term of this patent is extended or adjusted under 35 U.S.C. 154(b) by 570 days.

(21) Appl. No.: 11/457,565

(22) Filed: Jul. 14, 2006

(65) Prior Publication Data

US 2008/0013600 A1    Jan. 17, 2008

(51) Int. Cl.
H04B 1/00 (2006.01)
(52) U.S. Cl. .................................................. 375/132
(58) Field of Classification Search ............... 375/132
See application file for complete search history.

(56) References Cited

U.S. PATENT DOCUMENTS

| | | | |
|---|---|---|---|
| 3,806,804 A | 4/1974 | Mills et al. | |
| 4,152,647 A | 5/1979 | Gladden et al. | |
| 5,125,101 A | 6/1992 | Johnson et al. | |
| 5,483,670 A * | 1/1996 | Childress et al. | 455/515 |
| 5,629,978 A | 5/1997 | Blumhardt et al. | |
| 5,864,752 A * | 1/1999 | Pinder | 455/161.3 |
| 5,978,569 A | 11/1999 | Traeger | |
| 6,021,326 A * | 2/2000 | Nguyen | 455/422.1 |
| 6,047,160 A | 4/2000 | Priest et al. | |
| 6,415,158 B1 | 7/2002 | King et al. | |
| 6,693,236 B1 | 2/2004 | Gould et al. | |
| 7,280,807 B2 * | 10/2007 | Nguy et al. | 455/90.2 |
| 2003/0050083 A1 | 3/2003 | Metais et al. | |
| 2004/0121791 A1 | 6/2004 | May et al. | |
| 2004/0203799 A1 | 10/2004 | Siegel | |
| 2005/0068170 A1 | 3/2005 | Aupperle et al. | |
| 2006/0158329 A1 | 7/2006 | Burkley et al. | |
| 2006/0292988 A1 * | 12/2006 | Yuen et al. | 455/62 |

FOREIGN PATENT DOCUMENTS

| | | |
|---|---|---|
| WO | 2008008658 A2 | 1/2008 |
| WO | 2008008658 A3 | 1/2008 |
| WO | 2008027688 A2 | 3/2008 |
| WO | 2008027688 A3 | 3/2008 |
| WO | 2008027689 A2 | 3/2008 |
| WO | 2008027689 A3 | 3/2008 |
| WO | 2008027690 A2 | 3/2008 |

(Continued)

OTHER PUBLICATIONS

USA Office Action Dated Apr. 6, 2009—U.S. Appl. No. 11/457,565—14 Pages.

(Continued)

*Primary Examiner*—Curtis B Odom (57) ABSTRACT

A mobile device (110) and combined method (400/500) for frequency hopping is provided. The frequency hopping can combine a receive scanning (400) with a scanning (500) for a transmit frequency for providing automated channel selection. The transmit scanning can include determining whether a push to talk (PTT) is pressed (501), and selecting a transmit frequency from a set of frequency channels (130) based on a measured activity (150) on the set of frequencies. If the PTT (240) is within the hang-time (504), a frequency that is currently active during the hangtime can be selected, else, a frequency having a lowest activity count (506) can be selected for transmitting a communication in response to the PTT.

12 Claims, 4 Drawing Sheets

FOREIGN PATENT DOCUMENTS

| WO | 2008027690 A3 | 3/2008 |
|---|---|---|
| WO | 2008088580 A2 | 7/2008 |
| WO | 2008088580 A3 | 7/2008 |

OTHER PUBLICATIONS

USA Response to Office Action Dated Apr. 17, 2009—U.S. Appl. No. 11/457,565—10 Pages.
PCT International Preliminary Report Application No. PCT/US2007/072614 Dated Jan. 22, 2009—8 Pages.
PCT International Search Report Application No. PCT/US2007/072614 Dated Mar. 3, 2008—8 Pages.
Pinder, U.S. Appl. No. 11/469,280, filed Aug. 8, 2006.
PCT International Preliminary Examination Report Application No. PCT/US2007/075018—Dated Mar. 12, 2009—6 Pages.
PCT International Search Report Application No. PCT/US2007/075018—Dated Feb. 25, 2008—7 Pages.
Klein, U.S. Appl. No. 11/469,240, filed Aug. 31, 2006.
USA Advisory Action Dated Apr. 23, 2009 U.S. Appl. No. 11/469,240—4 Pages.
USA RCE With Accompanying Amendment Dated Apr. 26, 2008 U.S. Appl. No. 11/469,240—8 Pages.
USA Final Rejection Dated Feb. 25, 2009 U.S. Appl. No. 11/469,240—12 Pages.
USA Response to Final Rejection Dated Mar. 25, 2009 U.S. Appl. No. 11/469,240—3 Pages.
USA Office Action Dated Oct. 10, 2008 U.S. Appl. No. 11/469,240—12 Pages.
USA Response to Office Action Dated Dec. 2, 2008 U.S. Appl. No. 11/469,240—8 Pages.
PCT International Written Opinion Application No. PCT/US2007/075023—Dated Sep. 16, 2008—5 Pages.
Response to Written Opinion Application No. PCT/US2007/075023—Dated Dec. 2, 2008—3 Pages.
PCT International Preliminary Examination Report Application No. PCT/US2007/075023—Dated Mar. 12, 2009—8 Pages.
PCT International Search Report Application No. PCT/US2007/075023—Dated Sep. 16, 2008—8 Pages.
Klein, U.S. Appl. No. 11/469,217, filed Aug. 31, 2006.
USA Office Action Dated Feb. 5, 2009 U.S. Appl. No. 11/469,217—19 Pages.
USA Response to Office Action Dated Apr. 28, 2009 U.S. Appl. No. 11/469,217—10 Pages.
USA Office Action Dated Sep. 5, 2008 U.S. Appl. No. 11/469,217—18 Pages.
USA Response to Office Action Dated Nov. 10, 2008 U.S. Appl. No. 11/469,217—7 Pages.
PCT International Preliminary Examination Report Application No. PCT/US2007/075021—Dated Mar. 12, 2009—8 Pages.
PCT Internationalsearch Report Application No. PCT/US2007/075021—Dated Mar. 8, 2008—8 Pages.
Klein, U.S. Appl. No. 11/469,179, filed Aug. 31, 2006.
PCT International Preliminary Examination Report Application No. PCT/US2007/07519 Dated Mar. 12, 2009—8 Pages.
PCT International Search Report Application No. PCT/US2007/07519 Dated Jul. 8, 2008—7 Pages.

* cited by examiner

METHOD AND SYSTEM FOR TRANSMIT FREQUENCY HOPPING

FIELD OF THE INVENTION

The present invention relates to radio communication systems and, more particularly, to methods for frequency scanning.

BACKGROUND

The use of portable electronic devices and mobile communication devices has increased dramatically in recent years. Mobile communication devices such as two-way radios can operate in a number of environments over various frequency bands. Moreover, two-way radios are generally physically robust and can operate in harsh conditions. Two-way radios are particularly well suited for providing immediate two-way dispatch or group call communication under emergency situations, or operations in remote areas. In disaster situations, communication infrastructure is generally limited or absent making two-way radio communication a primary means of communication. In general, two-way radios can operate without the need of infrastructure support.

In such emergency conditions, multiple two-way radios can be distributed to dispatch teams who can communicate with one another over one or more dedicated frequencies. Moreover, a private line can be assigned to the dedicated frequency for allowing exclusive communication. For example, the dispatch teams generally agree on a private line to use in the field which allows all members of the team to communicate freely on the private line. Other people, not associated with the dispatch team, however, can also communicate on the same dedicated frequency, though on a different private line. Interference can arise when too many users are on the same dedicated frequency. Moreover, noise may be present on a dedicated frequency channel which can degrade communication quality. In these conditions, the members must generally agree to change to another dedicated frequency which requires the members to adjust the communication settings on the two-way radio. However, changing two-way radio settings in an emergency situation may not be a viable option. A need therefore exits for adjusting communication settings to avoid interference.

SUMMARY

Broadly stated, the invention is directed to a method and mobile device for combined receive and transmit frequency hopping. Embodiments of the invention combine a receive scanning on the mobile device with a scanning for a transmit frequency for providing automated channel selection.

One embodiment is a method for receive frequency hopping. The method can include scanning a set of frequency channels, determining whether a frequency is an active frequency, and assigning an activity level to the active frequency. An activity level can be assigned to each frequency. The method can include determining whether the active frequency corresponds to a private line of the mobile device, and if so, un-muting the mobile device on the active frequency for receiving incoming communication. The method can include waiting for a predetermined amount of time after the un-muting, and determining whether the PTT was pressed within the predetermined amount of time. If the PTT was pressed within the predetermined amount of time, the active frequency used during the receive scanning can be held as a transmit frequency for transmitting a communication in response to the PTT. If the PTT is not pressed within the predetermined amount of time, the method can further include determining whether the active frequency remains active during the predetermined amount of time. The combination of receive scanning with scanning for a transmit frequency can automatically select a transmit channel that has a low activity level. Similarly, the method can also automatically bypass an interference that presents high activity on the set of frequency channels.

Embodiments of the invention are also directed to a method for transmit frequency hopping, which can be used in conjunction with the method of receive scanning. The method can include determining whether a push to talk (PTT) is pressed, and selecting a transmit frequency from a set of frequency channels based on a measured activity on the set of channels. The method can include determining whether the PTT is pressed within a hang-time, and if the PTT is within the hang-time, the frequency that is currently active during the hangtime can be selected, else the frequency having a lowest activity count can be selected for transmitting a communication in response to the PTT. The method can further include determining whether the transmit frequency is an active frequency, and, if so, repeating the scanning of the set of frequency channels, and selecting the transmit frequency that has a next highest activity count. Else the method can include transmitting the communication on the transmit frequency until the PTT is released.

Embodiments of the invention also concern a mobile device for transmit frequency hopping. The system can include a receiver for performing a receive scanning on a set of frequency channels, a transmitter coupled to the receiver for transmitting a communication on a frequency identified by the receiver, and a processor coupled to the transmitter and receiver for combining the receive scanning with the transmitting for providing automated channel selection. On detecting a push-to-talk (PTT), the processor can select a transmit frequency from the set of frequency channels based on a measured activity on the set of channels.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "processing" can be defined as number of suitable processors, controllers, units, or the like that carry out a pre-programmed or programmed set of instructions. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Briefly, conventional radios can support communication on a committed frequency. The radios can scan for activity on the committed frequency, and allow inbound communication associated with a particular private line. An activity may correspond to one or more users communicating on a frequency thereby occupying a portion of the frequency bandwidth. For example, a plurality of radios can be designated with a same private line and distributed to a team. Members of the team can communicate with one another since the radios are on the same private line. As an example, the private line may be a channel number, such as 1-38, that can be physically set on the radio. In the field, the conventional radio will only scan for activity on the committed frequency. However, there are other frequencies available that may have less activity. The conventional radio may not be aware that less activity is present on the other frequencies, because the conventional radio is set to the committed frequency. Moreover, changing the frequency is generally a manual process which requires all team members to change to the new frequency.

Embodiments of the invention are directed to a method and mobile device that combines receive scanning with a scanning for a transmit frequency. The mobile device can scan a set of frequencies and identify activity levels associated with each frequency. The mobile device can select a frequency having low activity to bypass interference, such as other users on the frequency, or a noise source. The automated process of scanning and selecting a frequency can increase a quality of communication and an allocation of available bandwidth. Thus, audio quality can improve with less communication interference.

In the field, a plurality of the mobile devices can be programmed with identical frequency lists. Different groups using the mobile devices can be designated different private line codes. The designation of private line codes also allows the groups to use inactive frequencies. For example, each of the mobile devices in the group can coordinate group scanning for automatically changing to different frequencies. That is, the mobile devices can effectively track one another and change to a transmit frequency to remain in communication. In particular, the mobile devices can track one another by listening for a push-to-talk (PTT) and determining whether the PTT is within a predetermined amount of time from a previous communication. If the PTT is within the predetermined amount of time, the mobile device can all stay on the same frequency. It the PTT is not within the predetermined amount of time, the mobile device can change to a frequency having the lowest activity level. Accordingly, the mobile devices can remain in communication across multiple frequencies. By using the private line codes, inactive frequencies can also be utilized for communications for achieving efficiency through time sharing of the set of frequencies.

Broadly stated, the methods practiced by the invention provide a user with multiple frequencies. The availability of multiple frequencies allows the mobile devices to transmit such that an interference can be easily bypassed. This also allows multiple users to make efficient use of the available frequencies without having to manually make any radio adjustments.

Figure 1:
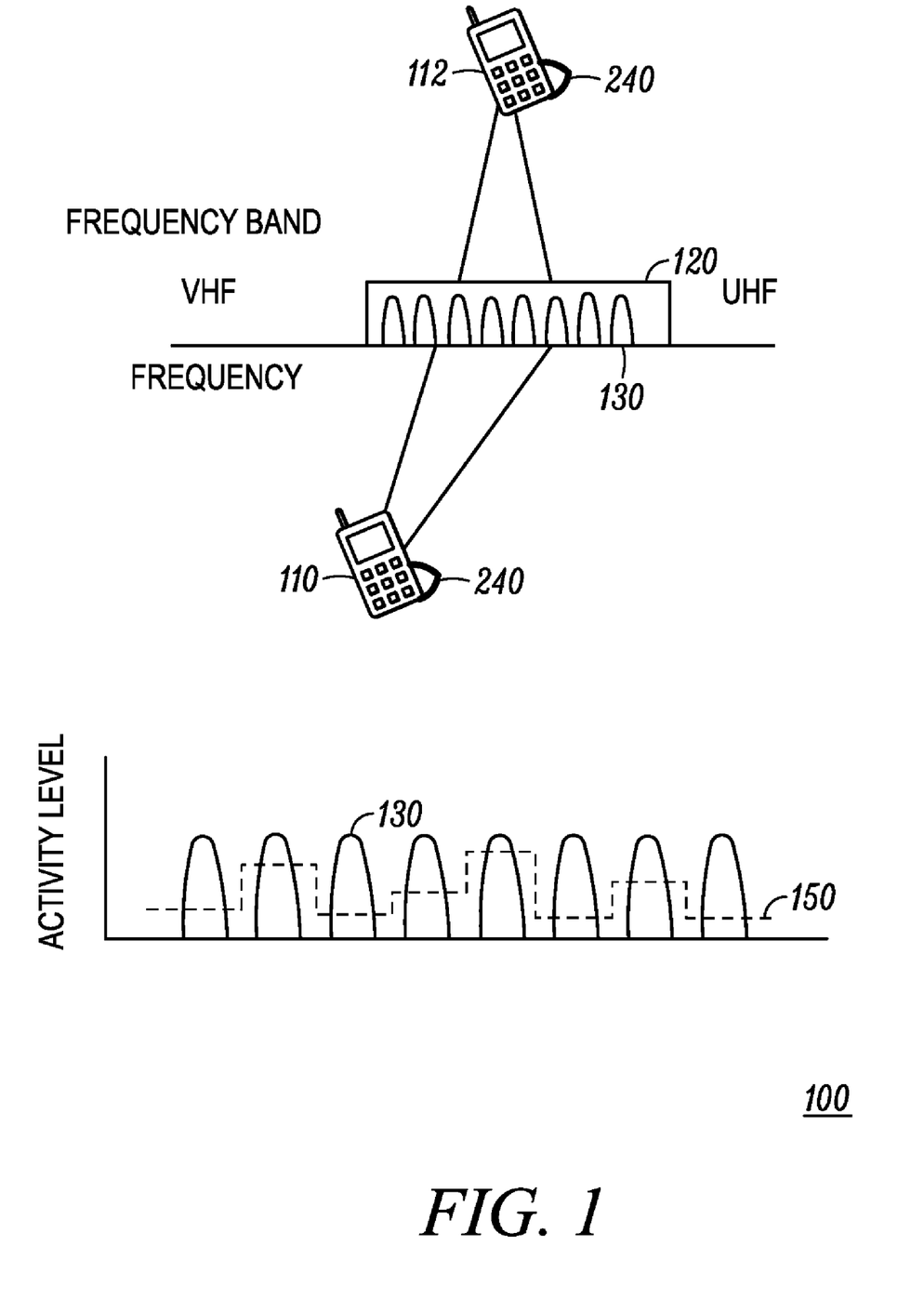
FIG. 1 is a mobile communication environment in accordance with the embodiments of the invention.

Referring to FIG. 1, a radio communication environment 100 for providing radio communication is shown. The radio communication environment 100 can include one or more subscribers, such as mobile device 110 and mobile device 112. A mobile device can be a cell phone, a personal digital assistant, a mobile communication device, a portable media player, an emergency communication device, a remote beacon device, a communication radio, or any other suitable communication device. As another example, the mobile device 110 can be a hand-held portable, bi-directional radio transceiver such as a walkie-talkie. Characteristics of the mobile device 110 may include a half-duplex channel where only one user can receive and transmit at a time, and a push-to-talk switch 240 that starts transmission. More than one mobile device can be present for providing group call or dispatch communication. In one aspect, the mobile devices 110 and 112 can communicate with one another over a radio frequency communication link. As is known in the art, the mobile devices 110 and 112 can each include a transmitter and a receiver for providing wireless communication over a radio frequency link.

The mobile devices communicate over one or more channels 130 within the frequency band 120. In radio terminology, a channel can be defined as a specific radio frequency, or band of frequencies, usually described in conjunction with a predetermined letter, number, or codeword. A channel 130 that is being used for providing data communication can also be considered an active frequency. The active frequency can have an associated activity level 150. For example, an active frequency that is currently being used for data communication can have an associated activity level 150 that describes a useage of the active frequency. For instance, if multiple users are repeatedly communicating on a frequency, the frequency will be associated with a high activity level. If few users are using a frequency, the frequency will be associated with a low activity level. The activity level can also describe the degree of use of a particular frequency. For example, the activity level can be expressed as a ratio or percentage of time the frequency level was used over a given time, or a sample time frame.

Briefly, the frequency spectrum 120 can be divided into a plurality of frequency bands such as UHF and VHF. As is known in the art, Very high frequency (VHF) is the radio frequency range from 30 MHz to 300 MHz. In contrast, Ultra high frequency (UHF) designates a range (band) of electromagnetic waves whose frequency is between 300 MHz and 3.0 GHz. UHF frequencies' propagation characteristics are ideal for short-distance terrestrial communication such as radio communication. As one example, the UHF band can support the Family Radio Service (FRS) which is an improved two-way system. FRS does not suffer the interference effects found on VHF bands such as Citizens Band (CB), or bands used by cordless phones, toys, and monitoring devices. As one example, within FRS, the mobile device 110 can communicate over 14 different channels, 7 of which are also shared with General Mobile Radio Service (GMRS). Embodiments of the invention are not however limited to the radio frequency bands and can include frequency bands associated with CDMA, OFDM, Wi-FI, and the like.

In practice, the mobile devices can be deployed within a remote environment where there may be little or no operational two-way radio infrastructure present. For example, an emergency team can be dispatched with a fleet of mobile devices for responding to a disaster event. The mobile devices can be in direct radio frequency communication without infrastructure support. The team members can select a private line for distinguishing between groups of users and allowing communication over a set of frequencies that are available the mobile devices. An automated frequency selection can increase the likelihood of a successful radio communication and can increase an efficiency in use of available frequencies.

Figure 2:
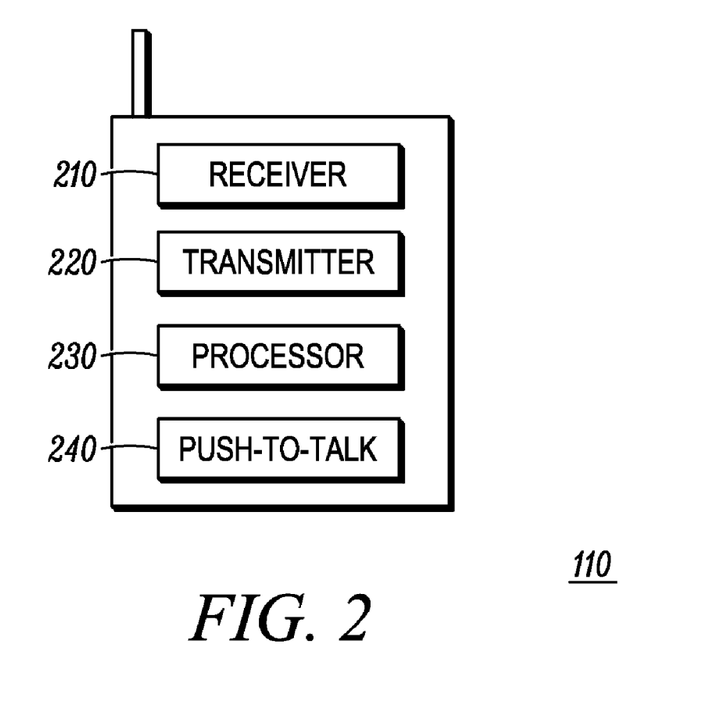
FIG. 2 is a block diagram of a mobile device in accordance with the embodiments of the invention.

Referring to FIG. 2, the mobile device 110 is shown in greater detail. The mobile device 110 can include a receiver 210 for performing a receive scanning on the set of frequency channels 130, a transmitter 220 coupled to the receiver 210 for transmitting a communication on a frequency identified by the receiver 210, and a processor 230 coupled to the transmitter 210 and receiver 220 for combining the receive scanning with the transmitting for providing automated channel selection. The mobile device 110 can include a push-to-talk (PTT) 240 for allowing half-duplex communication with other mobile devices.

In particular, on detecting a push-to-talk (PTT), which is an activation of the user pressing the PTT 240, the processor 230 selects a transmit frequency from the set of frequency channels 130 based on a measured activity on the set of channels. That is, the mobile device can automatically change a transmit frequency based on previously measured receive activity levels. In particular, multiple mobile devices sharing a private line can automatically reconfigure together to communicate on a frequency having a lowest activity level. The mobile device can combine a receive scanning with transmit frequency hopping to bypass high activity frequencies.

Figure 3:
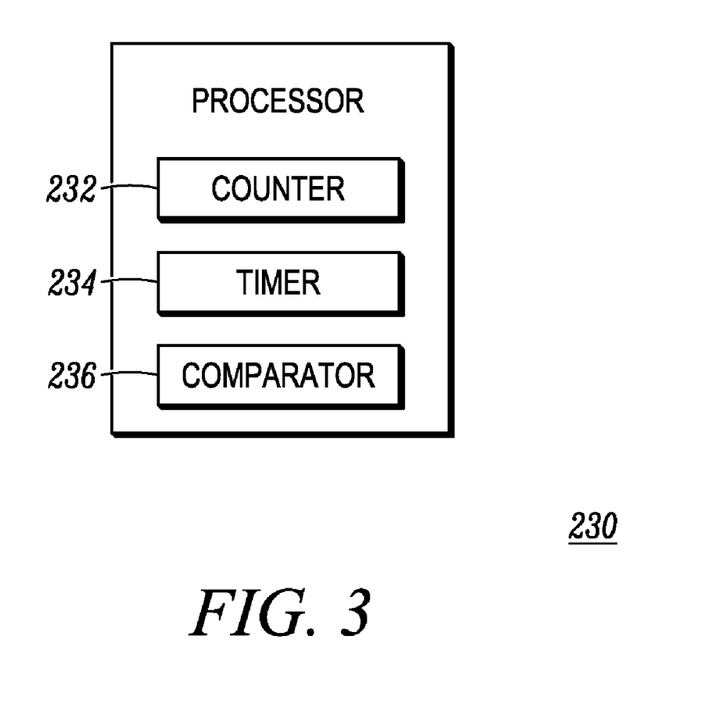
FIG. 3 is a more detailed block diagram of the mobile device of FIG. 2 in accordance with the embodiments of the invention.

Referring to FIG. 3, the processor 230 is shown in greater detail. The processor 230 can include a counter 232 for assigning an activity level to active frequencies, a timer 234 for determining whether a push to talk (PTT) 240 is initiated within a hang-time, and a comparator 236 for selecting a transmit frequency based on an activity level measured during the receive scanning. Briefly, referring to FIG. 1, the counter 232 can identify active frequencies 120 and assign an activity level 150 to the set of active frequencies. Briefly referring to FIG. 2, the processor can hold a frequency previously used for a receive communication and use that frequency as a transmit frequency if timer 234 identifies that the PTT 240 is pressed before a hang-time expires. That is, the timer 234 reports PTT activity and the processor 230 determines whether a receive frequency should also be used as a transmit frequency.

Figure 4:
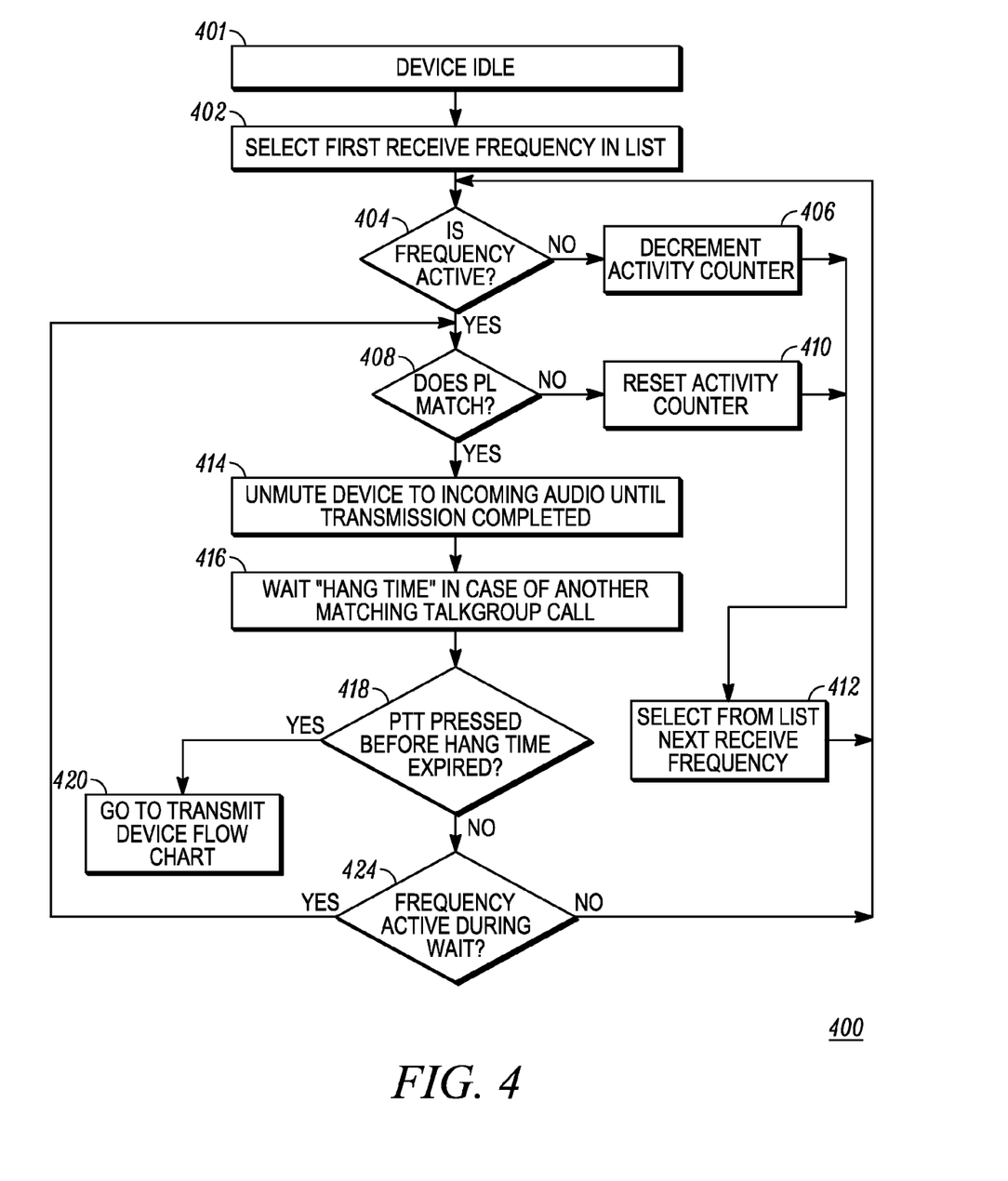
FIG. 4 is a flowchart for receive frequency hopping in accordance with the embodiments of the invention.

Referring to FIG. 4, a flowchart 400 for receive scanning on a mobile device is shown. The flowchart 400 can be implemented with more or less than the number of states shown. To describe the flowchart 400, reference will be made to FIGS. 1, 2 and 3 although it is understood that the flowchart 400 can be implemented in any other suitable device or system using other suitable components. Moreover, the flowchart 400 is not limited to the order in which the states are listed in the flowchart 400. In addition, the flowchart 400 can contain a greater or a fewer number of states than those shown in FIG. 4.

At state 401, the mobile device can be in an idle mode. For example, an idle mode may correspond to a state wherein the mobile device is not actively engaged in audio or data communication. During idle mode, at state 402, the mobile device can select a first receive frequency in a list. For example, referring to FIGS. 1 and 2, the processor 230 can select a frequency from a list of frequencies 130 in the frequency band 120. At state 404, the mobile device can determine if the frequency is active. Briefly, referring to FIGS. 1 and 2, the processor 230 can determine whether the transmitter 220 is actively receiving communication on a frequency. If no activity is identified on the frequency, the processor 230 can decrement an activity counter 232 associated with the frequency at state 406. For example, referring to FIG. 1, an activity counter can be associated with each frequency 130 within the frequency band 120. The activity counter identifies a useage of the frequency. During the receive scanning, the mobile device scans the set of frequency channels, determines whether a frequency is an active frequency, and assigns an activity level to the active frequency. After the activity counter 232 is decremented, at state 406, the mobile device can select the next frequency in the frequency band 120 at state 412 and return to state 404.

If, however, at state 404, the mobile device 110 does detect an active frequency, the mobile device 110 can determine whether the active frequency corresponds to a private line of the mobile device. For example, referring to FIG. 2, the processor 230 can query the transmitter 220 to determine whether a sub-audible tone corresponds to a private line of the mobile device 110. At state 408, the mobile device can determine whether the private line of the scanned receive frequency corresponds to the mobile device. If the private line does not correspond to the mobile device, at step 410, the mobile device can reset an activity counter associated with the scanned receive frequency. For example, referring to FIG. 2, the processor 230 can set the activity counter 232 to a high activity level to identify a high useage of the scanned receive frequency. The mobile device scans receive frequencies for determining activity levels on the frequencies, and accordingly, which frequencies more likely to be free from interference. If the private line does match that of the mobile device, the mobile device can be un-muted at state 414 on the active frequency for receiving incoming communication. That is, the mobile device determines that the communication on the frequency is directed to the mobile device and should be played out the device to a user. Moreover, a user of the mobile device can hear communications directed to a fleet having the same private line of the mobile device.

Upon playing out the incoming audio, at state 416, the mobile device can wait for a predetermined amount of time after the un-muting, and determine whether a PTT 240 (See FIG. 2) has been initiated within the predetermined amount of time at state 418. The predetermined amount of time corresponds to a hang-time. For example, a user of a first mobile device 110 (See FIG. 1) may press the PTT 240 (See FIG. 2) within a predetermined amount of time after the completion of the incoming communication transmission. For instance, a second user of a second mobile device 112 (See FIG. 1) may be actively speaking, and the user's voice may be playing out a speaker of the first mobile device. The timer 234 (See FIG. 3) can determine whether a user of the first mobile device 110 presses the PTT 240 within a few seconds after the second user has finished speaking. For example, the hang-time may be 2-3 seconds. Notably, the hang-time affords a window of time for one or more users on the same private line to respond to a dispatch communication, or a call. Within the hang-time, the same receive frequency can be used as a transmit frequency to provide an outbound communication in response to the inbound communication.

The same frequency used during the hang-time is re-used to avoid another receive scanning. This can reduce the amount of processing on a receiver since the same frequency is re-used without scanning for other frequencies. For example, each of the mobile devices in the fleet do not need to perform a receive scanning since a PTT was initiated within the hang-time. Accordingly, all mobile devices within the fleet can stay on the same frequency thereby conserving battery power associated with receive scanning.

Returning to flowchart 400, If, at state 418, the PTT was not pressed before the hang-time expired, the mobile device can determine whether the frequency was active during the hang-time at state 424. Briefly, in continuation of the previous example, other users on the same private line may be responding to the second user of the second mobile device 112 instead of the user of the first mobile device 110. For example, in fleet dispatch more than one user may respond to a group call. In this situation, the mobile device would want to hold the frequency for receiving additional communication on the same frequency. Accordingly, at state 408, the mobile device checks to determine whether the activity associated with the frequency corresponds to a private line of the mobile device; for example, a group call. The activity detected on the frequency at state 424 either corresponds to a user on the same private line fleet, a user on a different fleet, or perhaps excess noise on the frequency. The check at state 408 determines whether the activity is a result of other users on the same private line that are in continued communication.

At step 424, if the frequency is not active during the hang-time, the mobile device repeats the scanning the set of frequencies by returning to state 404. The process can repeat itself at state 404 of the flowchart 400.

Notably, embodiments of the invention are also directed to combining a receive scanning with a scanning for a transmit frequency for providing automated channel selection. That is, the mobile device selects a transmit frequency from the set of frequencies based on previously measured activity levels to bypass an interference on the set of frequency channels. The previously measured activity levels are determined by the receive scanning of flowchart 400.

Figure 5:
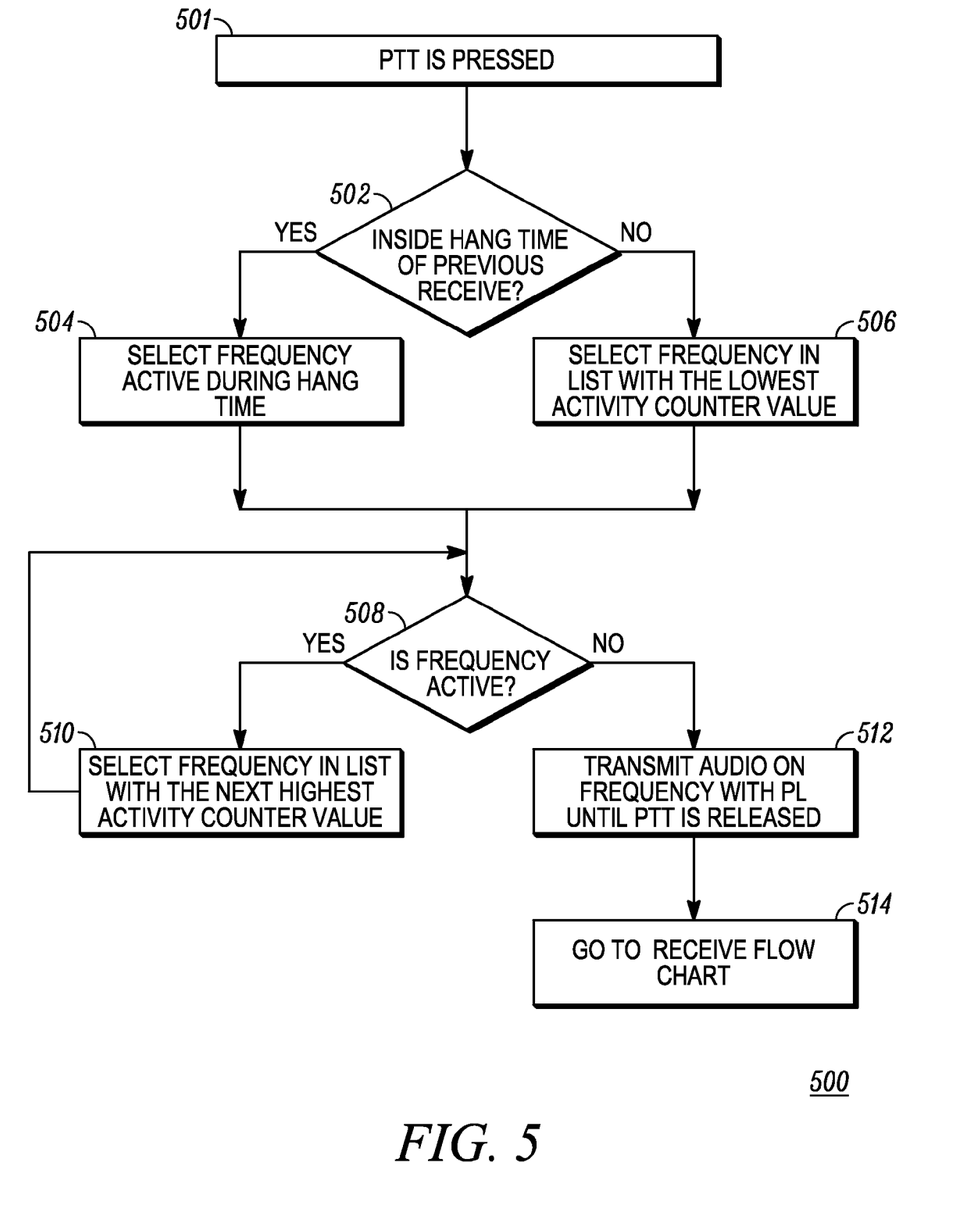
FIG. 5 is a flowchart for transmit frequency hopping in accordance with the embodiments of the invention.

Referring to FIG. 5, a flowchart 500 for transmit scanning on a mobile device is shown. The flowchart 500 can be implemented with more or less than the number of states shown. To describe the flowchart 500, reference will be made to FIGS. 1, 2 and 4 although it is understood that the flowchart 400 can be implemented in any other suitable device or system using other suitable components. Moreover, the flowchart 500 is not limited to the order in which the steps are listed in the method 500. In addition, the flowchart 500 can contain a greater or a fewer number of states than those shown in FIG. 5. The flowchart 500 can be a continuation of the flowchart 400 at state 420, and which can be used in conjunction with the states for receive scanning. In general, the receive scanning of flowchart 500 determines whether a push to talk (PTT) is initiated, and if so, selects a transmit frequency from a set of frequency channels based on a measured activity.

The flowchart 500 can start in a state 501 wherein a PTT 240 (See FIG. 2) has been pressed. For example, a user may initiate a PTT for commencing a group call, or responding to a communication from another user. At state 502 the mobile device can determine whether the PTT is pressed within a hang-time of a previous receive communication (e.g. inbound communication). For example, briefly referring back to FIG. 4, this may coincide with state 418. At state 504, If the PTT is pressed within the hang-time, the mobile device can hold the active frequency used during the receive scanning, and use the active frequency as a transmit frequency in response to the PTT. The transmit scanning of flowchart 500 works in conjunction with the receive scanning of flowchart 400. Recall, in the flowchart 400, an active frequency is held for transmitting a communication if a PTT is received within the hang-time of a receive communication. Accordingly, the mobile device and all other devices within the fleet having the same private line, coordinate a determination of the transmit frequency in accordance with the flowchart 500.

If, at state 502 the PTT is not pressed within the hang-time, then the mobile device selects the frequency in the list with the least activity at state 506. For example, referring to FIG. 1, the mobile device 110 selects a transmit frequency in the set of frequencies 120 having a lowest activity level 150 determined during the receive scanning. The mobile device selects a transmit frequency that has the least activity to avoid interference with other communication channels. Similarly, the activity level reveals whether noise is present on a frequency, and the selection process of state 506 can avoid selecting a frequency with high noise levels. For example, the mobile device can avoid frequencies having high energy noise which resemble activity. Notably, the mobile device 110 does not need to scan for frequencies during a transmit since the frequencies have been prioritized by activity level during the receive scanning.

At state 508, the mobile device can determine whether the selected frequency is active. If the frequency is active the mobile device, at state 510, can select a frequency with the next highest activity level. For example, other users on different private lines may key-up on a frequency during the hang-time of the receive scanning of flowchart 500. Accordingly, the mobile device, at state 508, performs a check to determine whether the frequency is in-use (e.g. active) prior to transmitting on the frequency. Through states 508 and 510, the mobile device can scan through all frequencies to identify a non-active channel. Upon identifying a non-active frequency, the mobile device, at state 512, can proceed to transmit audio on the active frequency. At state 514, the mobile device can revert to receive scanning. For example, the mobile device can continue receive scanning for active frequencies at state 401 of flowchart 400.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for receive frequency hopping on a mobile device, comprising:
combining a receive scanning over a set of frequency channels with a scanning for a transmit frequency on the set of frequency channels for providing automated channel selection, wherein:
on the receive scanning,
scanning the set of frequency channels;
determining whether a frequency is an active frequency; and
and wherein:
if a push-to-talk (PTT) is not initiated within a predetermined amount of time,
determining whether the active frequency remains active during the predetermined amount of time, and
if so,
determining whether the active frequency corresponds to a private line of the mobile device;
else,
repeating the scanning of the set of frequency channels.

2. The method of claim 1, further comprising:
on a push-to-talk (PTT),
selecting a transmit frequency from the set of frequency channels based on a previously measured activity level for bypassing an interference on the set of frequency channels.

3. The method of claim 1, further comprising:
on the scanning for a transmit frequency,
selecting an active frequency having a lowest activity level measured during the receive scanning.

4. The method of claim 1, wherein an active frequency is a frequency channel that is in use, and an activity level identifies a useage of the active frequency.

5. The method of claim 1, wherein the set of frequency channels further comprises:
on the receive scanning,
determining whether the active frequency corresponds to a private line of the mobile device; and
if so, un-muting the mobile device on the active frequency for receiving incoming communication.

6. The method of claim 5, further comprising:
if not,
resetting an activity counter for the active frequency, and
repeating the scanning of the set of frequency channels.

7. The method of claim 5, further comprising:
on the receive scanning:
waiting for a predetermined amount of time after the un-muting; and,
determining whether a PTT has been initiated within the predetermined amount of time.

8. The method of claim 7, further comprising:
if the PTT has been initiated within the predetermined amount of time,
holding the active frequency used during the receive scanning; and,
on the scanning for a transmit frequency:
using the active frequency as a transmit frequency for transmitting a communication in response to the PTT.

9. A method for transmit frequency hopping, comprising:
determining whether a push to talk (PTT) is pressed; and
selecting a transmit frequency from a set of frequencies based on a measured activity on the set of frequencies;
determining whether the PTT is Dressed within a hang-time, and
if the PTT is within the hang-time,
selecting the frequency that is currently active during the hangtime,
else
selecting the frequency having a lowest activity count, for transmitting a communication in response to the PTT;
determining whether the transmit frequency is an active frequency, and
if so,
repeating the scanning of the set of frequency channels;
selecting the transmit frequency that has a next highest activity count,
else,
transmitting the communication on the transmit frequency until the PTT is released;
upon a completion of the transmitting,
repeating the scanning of the set of frequency channels; and
updating activity levels for active frequencies.

10. A mobile device for transmit frequency hopping, comprising:
a receiver for performing a receive scanning on a set of frequency channels;
a transmitter coupled to the receiver for transmitting a communication on a frequency identified by the receiver;
a processor coupled to the transmitter and receiver for combining the receive scanning with the transmitting for providing automated channel selection,
wherein on detecting a push-to-talk (PTT), the processor selects a transmit frequency from the set of frequency channels based on a measured activity on the set of channels,
a counter for assigning an activity level to active frequencies;
a timer for determining whether a push to talk (PTT) is initiated within a hang-time;
a comparator for selecting a transmit frequency based on an activity level measured during the receive scanning; and
wherein the mobile device utilizes the transmit frequency hopping amongst a plurality of mobile devices which are in direct radio frequency communication without infrastructure support.

11. The mobile device of claim 10, wherein the receiver:
scans the set of frequency channels;
determines whether a frequency is an active frequency; and
determines whether the active frequency corresponds to a private line.

12. The mobile device of claim 10, wherein the mobile device is a cell phone, a personal digital assistant, a mobile communication device, a portable media player, an emergency communication device, a remote beacon device, or a communication radio.

* * * * *

UNITED STATES PATENT AND TRADEMARK OFFICE
CERTIFICATE OF CORRECTION

| | | |
|---|---|---|
| PATENT NO. | : 7,606,291 B2 | Page 1 of 1 |
| APPLICATION NO. | : 11/457565 | |
| DATED | : October 20, 2009 | |
| INVENTOR(S) | : Fudally | |

It is certified that error appears in the above-identified patent and that said Letters Patent is hereby corrected as shown below:

IN THE SPECIFICATION

1. In Column 5, Line 14, delete "WI-FI," and insert -- Wi-Fi, --, therefor.
(ORIGINALLY FILED SPECIFICATION DATED JULY 14, 2006, PAGE 8, LINE 13)

IN THE CLAIMS

2. In Column 9, Line 14, In Claim 1, delete "and" before "wherein:".
(AMENDMENTS TO THE CLAIMS DATED APRIL 17, 2009, PAGE 2, CLAIM 1, LINE 9)

3. In Column 10, Line 5, in Claim 9, delete "Dressed" and insert -- pressed --, therefor.
(AMENDMENTS TO THE CLAIMS DATED APRIL 17, 2009, PAGE 5, CLAIM 11, LINE 5)

Signed and Sealed this
Sixteenth Day of August, 2011

David J. Kappos
*Director of the United States Patent and Trademark Office*